L. SAWYER.
Curry-Combs.

No. 154,154. Patented Aug. 18, 1874.

Attest:
Laura S. Tower
Charles H Warren.

Inventor:
Langdon Sawyer

UNITED STATES PATENT OFFICE.

LANGDON SAWYER, OF SPRINGFIELD, VERMONT.

IMPROVEMENT IN CURRY-COMBS.

Specification forming part of Letters Patent No. 154,154, dated August 18, 1874; application filed January 7, 1874.

*To all whom it may concern:*

Figure 1:
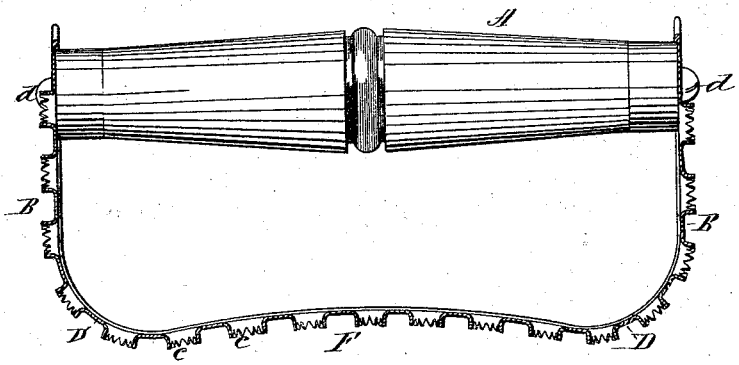
Figure 2:
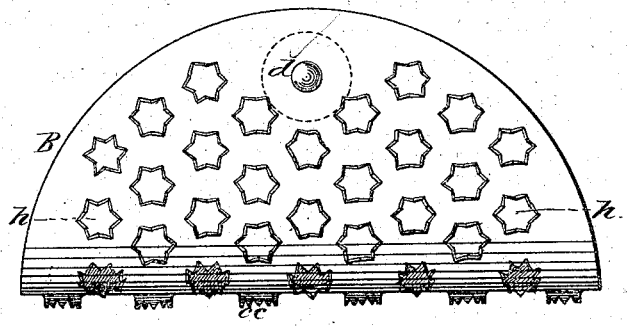

Be it known that I, LANGDON SAWYER, of Springfield, county of Windsor and State of Vermont, have invented a Curry-Comb, of which the following is a specification:

The object of my invention is to make a curry-comb more convenient and useful than those now in use, by having its teeth formed in small circles in such a manner as to inclose small openings; also, the lower surface of the comb, which comes in contact with the horse, adapted to the conformation of the surface to be carried, and the handle fastened above the comb, which is fully shown in Figures 1 and 2 of the accompanying drawing.

It is constructed as follows:

Over the surface of an oval sheet of tin or iron, of suitable size, small circles of teeth are cut and pressed down to the length the teeth will stand out below the surface, (shown in Fig. 1 at *c c*,) inclosing small openings, as shown, (Fig. 2, *h h*,) through which the dust and dirt will freely pass as it is raised by the teeth, thus escaping and overcoming the annoyance of having it collect on the under surface of the comb, as it does in those now in use. The two ends of the sheet are turned up to form the sides B B, the upper edges receive the handle A, the lower parts are turned in such a manner as to make a convex surface on each side of the lower part of the comb, (seen at D D, Fig. 1,) while the center is pressed up, forming a depression or concave surface. (Seen at F, Fig. 1.)

By this arrangement it will adapt itself to the surface of the animal to be curried, especially about the depressions of the limbs, which are so difficult to clean with a common comb.

The handle A passes directly across above the comb, and is secured to the upper edges of its sides B B by a screw. (Seen at *d* in Figs. 1 and 2.)

A comb constructed and combined as above described, can be used more effectually with less fatigue to the hand, and with much less annoyance to the animal, than those now in use.

What I claim as my invention is—

A curry-comb constructed with the teeth *c c*, openings *h h*, ends B B, handle A, convex surface D D, and the concave center F, combined substantially as above described.

LANGDON SAWYER.

Witnesses:
LAURA S. TOWER,
CHARLES H. WARREN.